US012576591B2

(12) United States Patent
Li

(10) Patent No.: US 12,576,591 B2
(45) Date of Patent: Mar. 17, 2026

(54) AUTOMATIC FILAMENT ENDING DEVICE

(71) Applicant: JF POLYMERS (SUZHOU) CO., LTD., Suzhou (CN)

(72) Inventor: Guan Li, Suzhou (CN)

(73) Assignee: JF POLYMERS (SUZHOU) CO., LTD., Suzhou (CN)

( * ) Notice: Subject to any disclaimer, the term of this patent is extended or adjusted under 35 U.S.C. 154(b) by 243 days.

(21) Appl. No.: 18/207,111

(22) Filed: Jun. 7, 2023

(65) Prior Publication Data

US 2023/0311418 A1 Oct. 5, 2023

Related U.S. Application Data

(63) Continuation of application No. PCT/CN2023/083291, filed on Mar. 23, 2023.

(30) Foreign Application Priority Data

Dec. 29, 2022 (CN) .......................... 202211712156.3
Dec. 29, 2022 (CN) .......................... 202223539575.X

(51) Int. Cl.
*B29C 64/321* (2017.01)
*B29C 64/118* (2017.01)
(Continued)

(52) U.S. Cl.
CPC ............ *B29C 64/321* (2017.08); *B33Y 40/00* (2014.12); *B65H 54/71* (2013.01); *B65H 54/74* (2013.01);
(Continued)

(58) Field of Classification Search
CPC .... B65H 65/005; B65H 75/285; B65H 54/71; B65H 57/003; B65H 54/22; B65H 19/29;
(Continued)

(56) References Cited

U.S. PATENT DOCUMENTS 4,019,543 A * 4/1977 Sasaki .................... B65H 65/00
29/451
4,034,933 A * 7/1977 Hara ...................... B65H 75/08
242/125.3
(Continued)

FOREIGN PATENT DOCUMENTS

CN 109365693 A 2/2019
CN 113060595 A * 7/2021 .............. B65C 9/00
(Continued)

OTHER PUBLICATIONS

Huang, English translation of CN113060595 (Year: 2021).*

*Primary Examiner* — Anna M Momper
*Assistant Examiner* — Tiffany Domonique Jefferson
(74) *Attorney, Agent, or Firm* — FIDELI LAW PLLC

(57) ABSTRACT

A device for fixing a tail end of a filament to a filament spool is provided. The device includes a filament threading module having a filament feeding module and a filament guide mechanism. The filament feeding module is configured to clamp the filament and pass the tail end of the filament through a first threading hole on the filament spool. And the filament guide mechanism including a filament guide assembly is used to guide the tail end to pass through a second threading hole on the filament spool after the tail end of the filament has passed through the first threading hole. The filament guide assembly including a filament guide and a filament driver. The filament driver is configured to move the filament guide assembly towards or away from the filament spool.

20 Claims, 14 Drawing Sheets

(51) Int. Cl.
  *B33Y 40/00*     (2020.01)
  *B65H 54/71*     (2006.01)
  *B65H 54/74*     (2006.01)
  *B65H 57/00*     (2006.01)
(52) U.S. Cl.
  CPC .......... *B65H 57/003* (2013.01); *B29C 64/118*
    (2017.08); *B65H 2405/52* (2013.01)
(58) Field of Classification Search
  CPC ........ B65H 2301/414443; B29C 53/80; B29C
    2053/8033
  USPC ............... 242/164, 125.1, 475.7, 487.1, 580,
    125.2,
    242/475.8, 476.6, 587, 125.3
  See application file for complete search history.

(56) References Cited

U.S. PATENT DOCUMENTS

| | | | | | |
|---|---|---|---|---|---|
| 4,796,830 | A | * | 1/1989 | Gelfman ................ | H02G 11/02 |
| | | | | | 242/574.4 |
| 5,460,333 | A | * | 10/1995 | Vanhuyse .............. | B65H 75/28 |
| | | | | | 242/476.6 |
| 5,901,920 | A | * | 5/1999 | Takahashi .............. | B65H 65/00 |
| | | | | | 242/125.3 |
| 5,931,408 | A | * | 8/1999 | Ishii ........................ | B65H 75/28 |
| | | | | | 242/125.3 |
| 7,954,748 | B2 | * | 6/2011 | Weissbrod ............. | B65H 75/14 |
| | | | | | 242/580 |
| 10,759,630 | B2 | * | 9/2020 | Sigmon .................. | B65H 75/28 |
| 12,410,034 | B2 | * | 9/2025 | Baranov ................. | B65H 65/00 |
| 2002/0038516 | A1 | * | 4/2002 | Kinoshita .............. | B65H 65/00 |
| | | | | | 33/520 |
| 2008/0251620 | A1 | * | 10/2008 | Neubert ............. | B29C 53/8091 |
| | | | | | 242/570 |
| 2018/0273339 | A1 | * | 9/2018 | Kotzur ................. | B65H 75/246 |
| 2020/0116967 | A1 | * | 4/2020 | Xia ........................ | B65H 75/28 |
| 2020/0227986 | A1 | | 7/2020 | Straub et al. | |
| 2021/0371230 | A1 | * | 12/2021 | Yui ........................ | B21C 47/28 |
| 2023/0101194 | A1 | * | 3/2023 | Edstrom ............... | B65H 54/22 |
| | | | | | 242/473.8 |

FOREIGN PATENT DOCUMENTS

| | | | |
|---|---|---|---|
| CN | 216544728 | U | 5/2022 |
| CN | 219058131 | U | 5/2023 |

* cited by examiner

4

6

43

25

10

44

19

14

AUTOMATIC FILAMENT ENDING DEVICE

RELATED APPLICATION

This application is a continuation of PCT/CN2023/083291, filed on Mar. 23, 2023, which claims the benefit of priority of Chinese invention patent application No. 2022117121563, filed on Dec. 29, 2022; the application also claims the benefit of priority of Chinese utility model patent application No. 202223539575X, filed on Dec. 29, 2022, and the contents of the foregoing documents are incorporated herein by reference in the entirety.

TECHNICAL FIELD

The present disclosure relates to a filament ending device, in particular to an automatic filament ending device.

BACKGROUND

In the existing extrusion 3D printing consumables production industry, a main obstacle to realizing fully automatic on-line winding is the inability to achieve fully automatic filament ending, which affects the winding efficiency.

In the existing technology, for example, in 202123014331.5, an automatic filament ending mechanism for a 3D printing filament spool is provided, which is characterized in that the mechanism includes a work platform arranged on a 3D printing machine equipment, the work platform is equipped with an X-axis shifting and cutting module, the X-axis shifting and cutting module is provided with a Y-axis and cutting shifting module, one side of the Y-axis shifting and cutting module is provided with a Z-axis shifting and cutting module, one side of the Z-axis shifting and cutting module is provided with a rotating unit, one side of the rotating unit is provided with a lifting cylinder I, a bottom portion of the lifting cylinder I is provided with a pneumatic cylinder IV, a pneumatic cutter is provided on the pneumatic cylinder IV, the rotating unit is provided with a lifting cylinder III and a lifting cylinder II, an output shaft of the lifting cylinder III is provided with a gripper unit I, the lifting cylinder II is provided with a gripper unit II, one side of the work platform is provided with a filament spool, the filament spool is provided with a cable strip, and a filament pressing cylinder is provided below the work platform.

However, in practice, the above device may take up a lot of space. In addition, during the implementation of the filament ending method, there is a risk of filament ending failure during processes such as gripper clamping of a filament and gripper switching.

In view of the above-mentioned defects, an automatic filament ending device is designed to gain more industrial application values.

BRIEF SUMMARY

In order to solve the above technical problems, one object of the present disclosure is to provide an automatic filament ending device.

According to some exemplary embodiments of the present disclosure, a device for fixing a tail end of a filament to a filament spool is provided, including: a filament threading module including: a filament feeding module, configured to pass the tail end of the filament through a first threading hole on the filament spool, and a filament guide mechanism, configured to guide the tail end to pass through a second threading hole on the filament spool after the tail end of the filament has passed through the first threading hole.

With the technical solution provided above, the present disclosure has at least the following advantages:

1. The present disclosure can achieve unmanned filament winding and automatic filament ending performance, greatly improving efficiency, reducing labor, and avoiding quality risks caused by manual misoperation.

2. After configuring the filament spool, the perforated winding of the filament can be achieved.

3. The overall structure of the present disclosure is simple, which can fit filaments of various materials and filament spools of various specifications.

The above descriptions are merely a summary of technical solutions of the present disclosure. In order to provide clear understanding of the technical means of the present disclosure and implement them according to the contents of the description, some exemplary embodiments of the present disclosure and accompanying drawings will be described in detail below.

Figure 1:
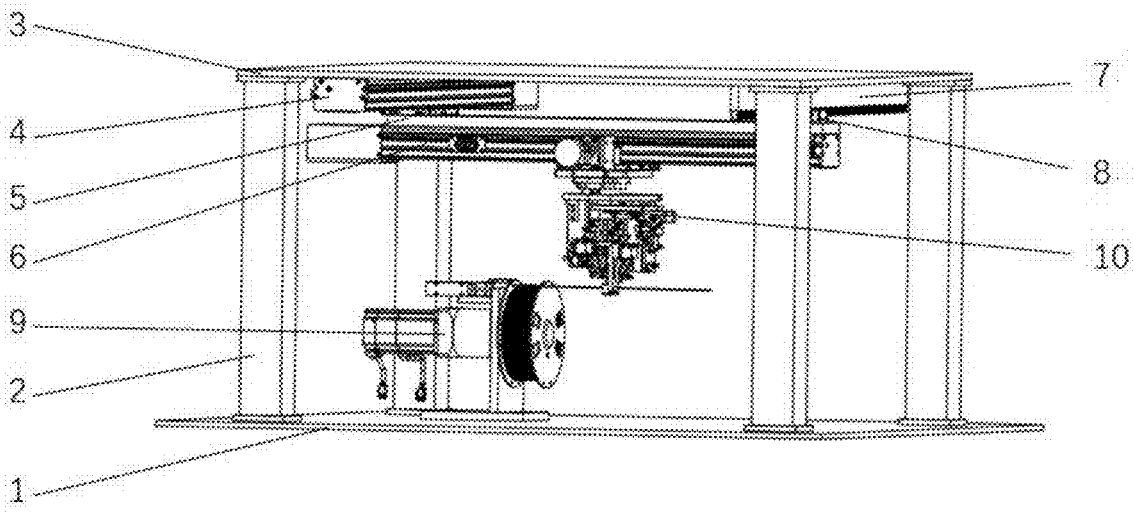
FIG. 1 is a schematic diagram of the structure of an automatic filament ending device according to some exemplary embodiments of the present disclosure.

The element numerals shown in the figures are described below.

| | |
|---|---|
| 1 device base plate | 2 composite motion module pillar |
| 3 mounting top plate | 4 y-axis linear motion module |
| 5 module mounting plate | 6 x-axis linear motion module |
| 7 rail slider mounting plate | 8 heavy-duty rail slider |
| 9 filament winding module | 10 filament threading module |
| 11 filament spool | 12 filament winding bottom plate |
| 13 filament spool mounting plate | 14 filament guide mechanism |
| 15 servo motor | 16 speed reducer |
| 17 clamping tray | 18 winding spindle |
| 19 filament guide assembly | 20 cover plate assembly |
| 21 cover plate connection block | 22 cover plate lifting cylinder |
| 23 cylinder connection plate | 24 filament guide displacement cylinder |
| 25 rotation platform | 26 platform mounting plate |
| 27 main mounting plate | 28 filament cutting module |
| 29 filament feeding module | 30 filament tensioning module |
| 31 filament cutting mounting plate | 32 main reinforcement block |
| 33 pneumatic cutter lifting cylinder | 34 pneumatic cutter |
| 35 main connection plate | 36 auxiliary reinforcement block |
| 37 filament clamping mounting plate | 38 filament clamping module lifting connection plate |
| 39 auxiliary mounting block | 40 cushion |
| 41 filament clamping lifting cylinder | 42 connector |
| 43 first filament clamping module | 44 second filament clamping module |
| 45 first mounting block | 46 first filament clamping cylinder |
| 47 first gripper primary jaw | 48 first gripper secondary jaw |
| 49 first limit mounting block | 50 limit connection block |
| 51 limit rod | 52 first limit cylinder |
| 53 second filament clamping mounting block | 54 slider |
| 55 second filament clamping displacement cylinder | 56 second filament clamping mounting plate |
| 57 second filament clamping cylinder | 58 main gripper |
| 59 secondary gripper | 111 first threading hole |
| 112 second threading hole | 100 filament |
| 101 tail end | 191 base plate |
| 192 filament guide | |

DETAILED DESCRIPTION

Specific implementations of the present disclosure will be further described in detail below in conjunction with the accompanying drawings and some exemplary embodiments. The following exemplary embodiments are provided to illustrate the present disclosure, but are not intended to limit the scope of the present disclosure With reference to FIG. 1 to FIG. 10, an automatic filament ending device is provided, which includes a device base plate 1. In addition, the filament ending device according to the present disclosure has the following unique designs. A plurality of composite motion module pillars 2 are arranged on the device base plate 1. The top of the plurality of composite motion module pillars 2 is provided with a mounting top plate 3. A Y-axis linear motion module 4 is arranged below the mounting top plate 3. A module mounting plate 5 is movably connected below the Y-axis linear motion module 4. An X-axis linear motion module 6 is arranged on the module mounting plate 5. At the same time, a mounting plate 7 of a rail slider 54 is provided below the mounting top plate 3. The mounting plate 7 of the rail slider 54 is connected with the X-axis linear motion module 6 via a heavy-duty rail slider 8. Moreover, considering the needs of winding filament collection and discharge, a filament winding module 9 is arranged on the device bottom plate 1. In addition, in order to realize filament threading guidance, a filament threading module 10 is arranged on the X-axis linear motion module 6. Specifically, the filament threading module 10 includes a rotation platform 25. A platform mounting plate 26 is connected on the rotation platform 25. A main mounting plate 27 is arranged below the platform mounting plate 26. A lower side of the main mounting plate

27 is provided with a filament cutting module 28, a filament feeding module 29, and a filament tensioning module 30.

Furthermore, taking into account the needs to apply continuous and stable tensions and prevent unnecessary filament bending and curling, the filament tensioning module 30 includes a first filament clamping module 43 and a second filament clamping module 44.

Figure 2:
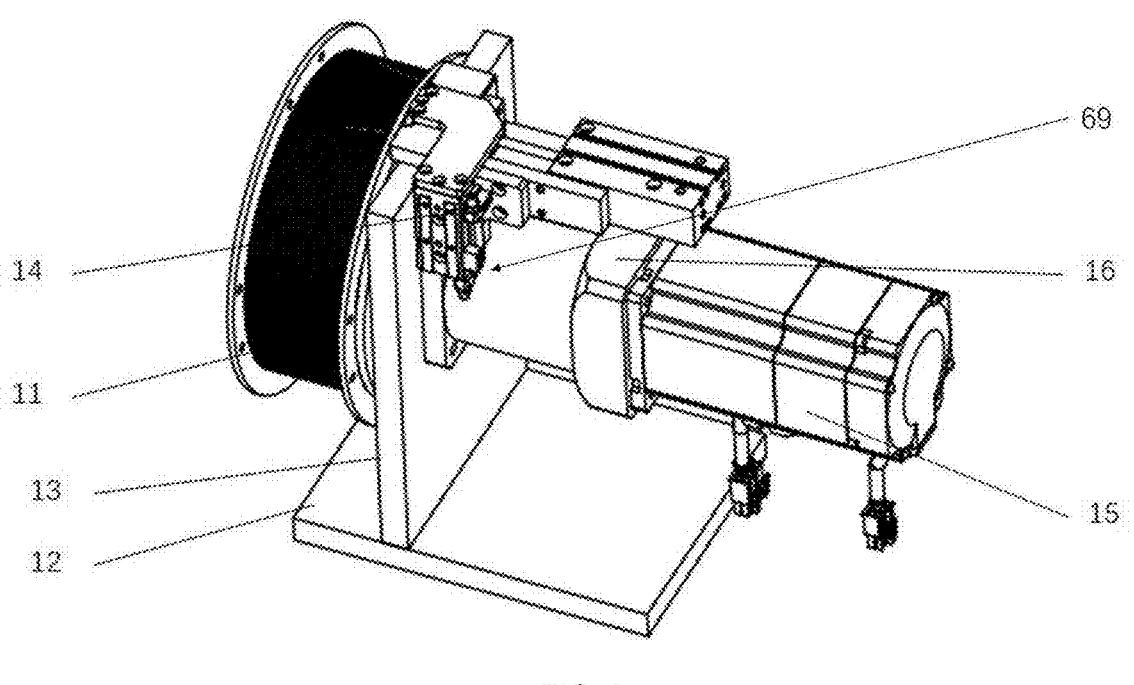
FIG. 2 is a schematic diagram of the structure of a filament winding module according to some exemplary embodiments of the present disclosure.
Figure 5:
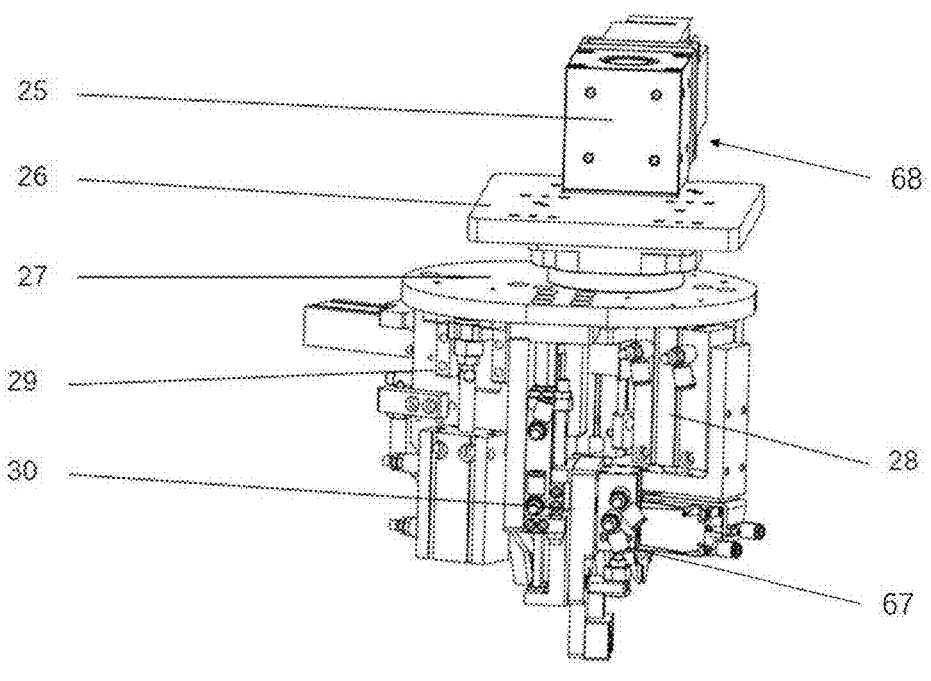
FIG. 5 is a schematic diagram of an overall structure of a filament threading module according to some exemplary embodiments of the present disclosure.

According to some exemplary embodiments of the present disclosure, as shown in FIG. 2, the filament winding module 9 used herein may include a winding bottom plate 12 connected to the device base plate 1. A spool mounting plate 13 is arranged on the winding bottom plate 12. A transmission shaft is arranged on the spool mounting plate 13. One end of the transmission shaft is connected to a filament spool 11, and the other end of the transmission shaft is provided with a servo motor 15. An upper end of the spool mounting plate 13 is provided with a filament guide mechanism 14. In this way, the winding speed may be controlled to cooperate with the feeding speed of the filament. Specifically, as shown in FIG. 5, the filament spool 11 used herein includes a clamping tray 17. A winding spindle 18 is arranged at the center of the clamping tray 17. At the same time, the filament guide mechanism 14 includes a filament guide assembly 19. An upper end of the filament guide assembly 19 is provided with a cover plate assembly 20. A cover plate connection block 21 is provided on an upper end of the cover plate assembly 20. In order to effective finer-tune the filament winding, according to some exemplary embodiments of the present disclosure, a cover plate lifting cylinder 22 is further provided on the cover plate connection block 21. The cover plate lifting cylinder 22 is connected with a filament guide displacement cylinder 24 via a cylinder connection plate 23. Moreover, in order to better control the operating speed, according to some exemplary embodiments of the present disclosure, a speed reducer 16 is further provided on the servo motor 15.

Figure 6:
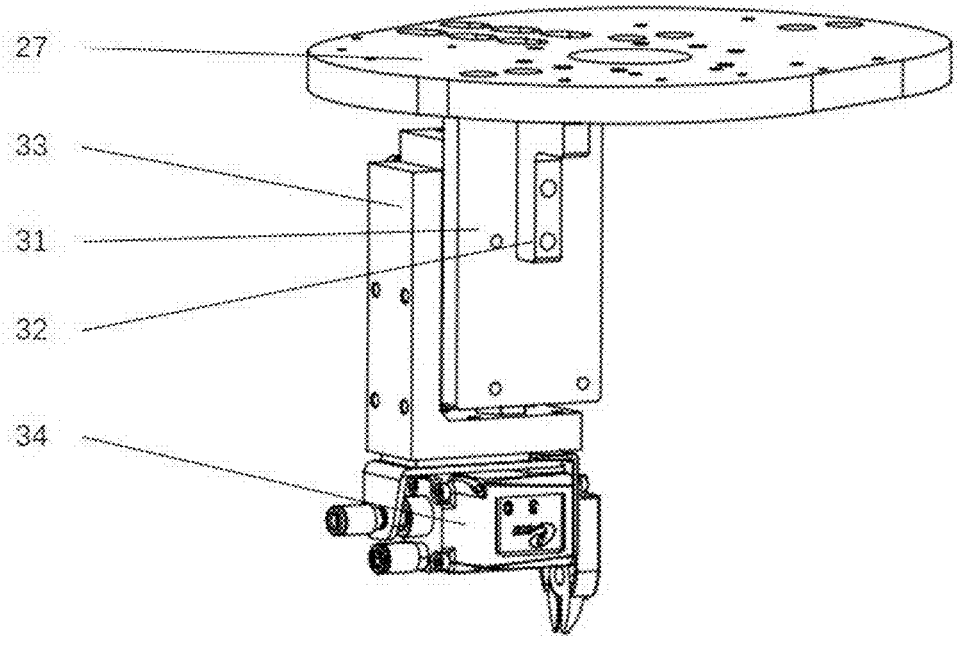
FIG. 6 is a schematic diagram of the structure of a filament cutting module according to some exemplary embodiments of the present disclosure.
Figure 7:
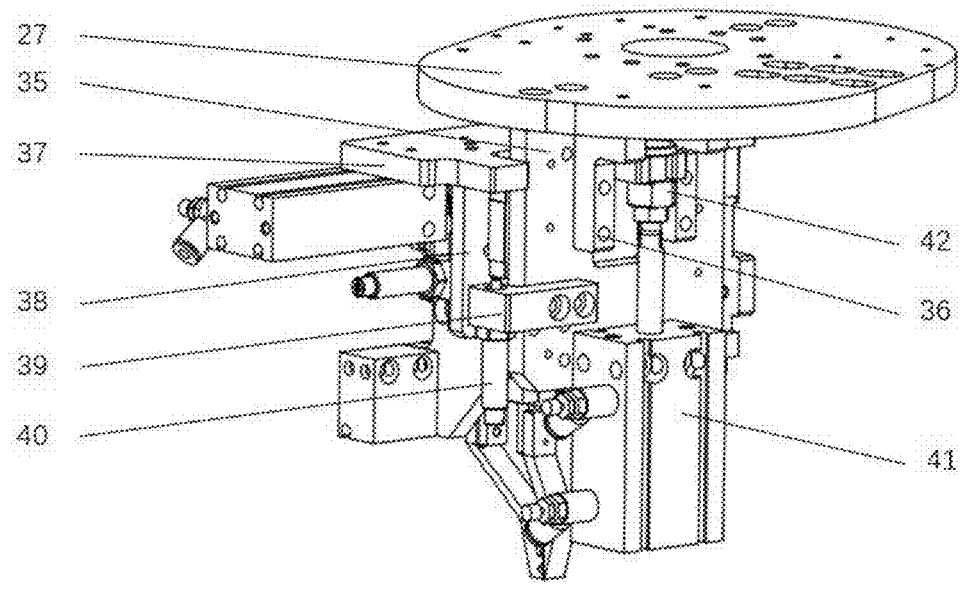
FIG. 7 is a schematic diagram of the structure of a filament feeding module according to some exemplary embodiments of the present disclosure.
Figure 8:
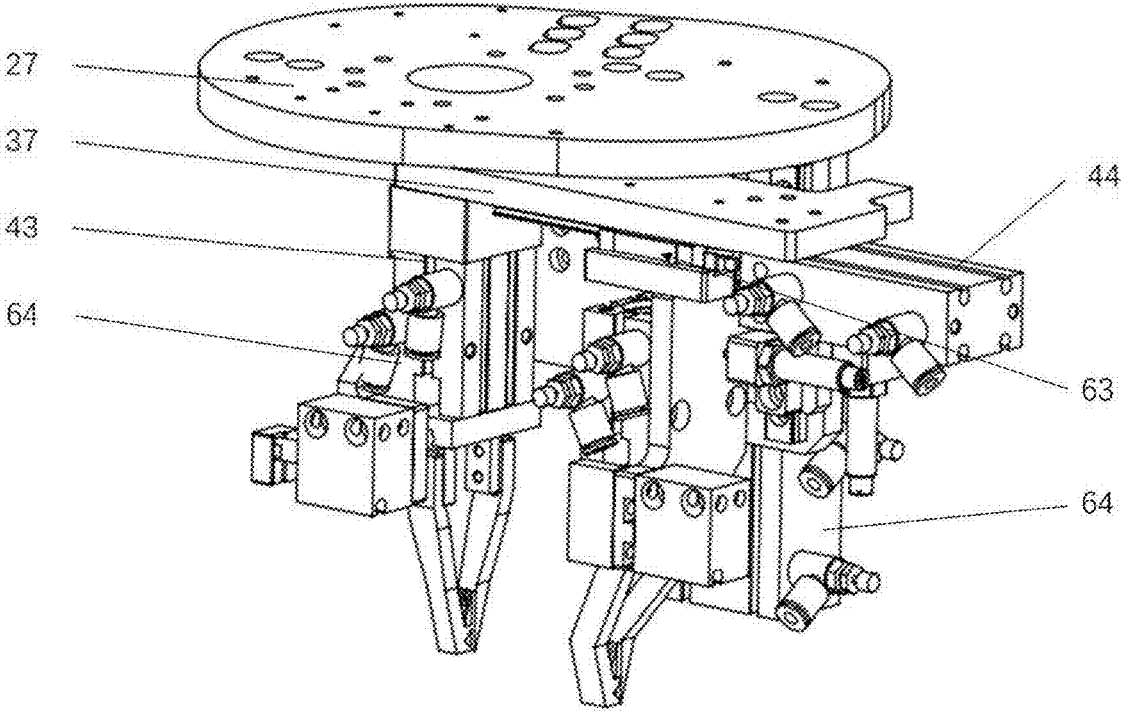
FIG. 8 is a schematic diagram of the structure of a filament tensioning module according to some exemplary embodiments of the present disclosure.

Furthermore, as shown in FIGS. 5, 6 and 7, in order to realize the automatic cutting of filament, especially to meet the needs of the filament ending operation, the filament cutting module 28 used herein includes a filament cutting mounting plate 31 that is connected to the main mounting plate 27. One side of the filament cutting mounting plate 31 is provided with a pneumatic cutter lifting cylinder 33. A pneumatic cutter 34 is provided on the pneumatic cutter lifting cylinder 33. In this way, the current cutting edge position of the pneumatic cutter 34 may be adjusted according to the position of the filament to ensure smooth cutting. In addition, considering the stability of the installation, a main reinforcement block 32 is arranged on the other side of the filament cutting mounting plate 31.

In practice, in order to achieve continuous and stable filament feeding and meet the requirements of tension adjustments between filaments, the filament feeding module 29 further includes a main connection plate 35 that is connected to the main mounting plate 27, and a plurality of auxiliary reinforcement blocks 36 are arranged on the main connection plate. At the same time, an upper end of the main connection plate 35 is provided with a filament clamping mounting plate 37. A second filament clamping module 44 and a filament clamping module lifting connection plate 38 are connected on the filament clamping mounting plate 37. Moreover, to better guide the filament routing and realize horizontal filament feeding, according to some exemplary embodiments of the present disclosure, a filament clamping lifting cylinder 41 is provided on one side of the main connection plate 35. The filament clamping lifting cylinder 41 is connected with the main connection plate 35 via a connector 42. Furthermore, the main connection plate 35 is provided with a cushion 40 via an auxiliary mounting block 39. This can achieve cushioning of the cylinder movement and avoid unnecessary shaking of the filament.

Moreover, according to some exemplary embodiments of the present disclosure, the first filament clamping module 43 may include a first mounting block 45 connected to the filament clamping mounting plate 37. A first filament clamping cylinder 46 is provided on the first mounting block 45. A lower end of the first filament clamping cylinder 46 is provided with a first gripper primary jaw 47. At the same time, the first filament clamping cylinder 46 is provided with a first limit mounting block 49. The bottom of the first limit mounting block 49 is provided with a first gripper secondary jaw 48 in cooperation with the first gripper primary jaw 47. In addition, the first limit mounting block 49 is provided with a first limit cylinder 52. A limit rod 51 of the first limit cylinder 52 passes through the first limit mounting block 49 and is further provided with a limit connection block 50. In this way, an appropriate limit can be achieved, so that the first gripper primary jaw 47 may better perform filament clamping.

Furthermore, according to some exemplary embodiments of the present disclosure, the second filament clamping module 44 includes a slide rail connected to the filament clamping mounting plate 37. The slide rail is connected with a second filament clamping mounting block 53 via a slider 54. The second filament clamping mounting block 53 is provided with a second filament clamping displacement cylinder 55. In this way, the second filament clamping module 44 has a certain horizontal adjustment space, which facilitates the distance from the filament tensioning module 30, thereby matching various application distances of different filament ending operations. Specifically, the second filament clamping displacement cylinder 55 is connected to the second filament clamping mounting block 53. In addition, a second filament clamping mounting plate 56 is arranged below the second filament clamping mounting block 53. A second filament clamping cylinder 57 is arranged on the second filament clamping mounting plate 56. In addition, a main gripper 58 and a secondary gripper 59 are provided on the second filament clamping cylinder.

The working mechanism of the present disclosure is as follows.

With reference to FIG. 10 to FIG. 18, after the filament spool winding is finished, the X-axis linear motion module 6 and the Y-axis linear motion module 4 perform composite motions to move the filament threading module 10 above the filament clamping and cutting position, and the rotation platform 25 adjusts the angle of the filament threading module 10. filament clamping lifting cylinder 41 drives the first filament clamping module 43 and the second filament clamping module 44 to move down to the clamping position, and then the filament clamping cylinder drives the grippers to clamp the filament. After the filament is clamped and fixed, the pneumatic cutter lifting cylinder 33 drives the pneumatic cutter 34 to move down to the filament cutting position, and then then pneumatic cutter 34 cuts the filament.

Subsequently, the composite motions of the X-axis linear motion module 6 and the Y-axis linear motion module 4 to move the filament threading module 10 that clamps the filament to a threading position of the filament spool. The rotation platform 25 adjusts the angle of the filament threading module 10, so as to adjust the angle of the filament. Next, the first filament clamping module 43 passes the filament through a first threading hole 111 of the filament spool, and sends it into the filament guide assembly 19 of the filament guide mechanism 14.

The second filament clamping displacement cylinder 55 drives the second filament clamping module 44 to reciprocate multiple times to make the filament pass through the filament guide assembly 19 and then pass through a second threading hole 112 of the filament spool. The filament guide cover plate assembly 20 allows the filament guide to become a closed cavity, thereby preventing the filament from running out of the filament guide.

During the threading process, the filament tensioning module 30 is allowed to wait at the second threading hole 112 of the filament spool. After the filament passes through the second threading hole 112 of the filament spool, the filament is pulled into the filament tensioning module so as to clamp the filament.

When the filament is pulled into the filament tensioning module 30 to clamp the filament, the filament guide cover plate lifting cylinder 22 drives the filament guide cover plate assembly 20 to move up. The filament guide displacement cylinder 24 drives the filament guide assembly 19 to retreat. The filament tensioning module 30 tightens the filament driven by the composite motions of the X-axis linear motion module 6 and the Y-axis linear motion module 4.

After the filament ending operation is finished, each module returns to its original position, and the filament ending is thus completed.

Based on the above description of the present disclosure in conjunction with the accompanying drawings, it can be seen that the present disclosure has the following advantages:

1. The present disclosure can achieve unmanned filament winding and automatic filament ending performance, greatly improving efficiency, reducing labor, and avoiding quality risks caused by manual misoperation.
2. After configuring the filament spool, the perforated winding of the filament can be achieved.

3. The overall structure of the present disclosure is simple, which can fit filaments of various materials and filament spools of various specifications.

The device of some exemplary embodiments of the present disclosure will be further described below:

The device provided in some exemplary embodiments of this disclosure can be applied to the production line of 3D printing filament. After the production of the printing filament, the printing filament needs to be wound onto a filament spool. After the winding is completed, the end of the filament needs to be fixed to the filament spool, so as to finish the filament ending process. After completing the filament ending process, the filament spool can be changed to carry out the winding and filament ending process of the next filament spool.

The filament ending process herein refers to a process of treating a tail end of a filament wound on a filament spool. After finishing the filament winding, the tail end of the filament needs to be fixed or knotted with the filament spool to prevent the filament wound on the filament spool from loosening. Thus, filament ending could be understood as fixing or knotting at the tail end of the filament. That is, the filament ending process herein is a process of fixing or knotting the tail end of the filament with the filament spool.

Figure 19:
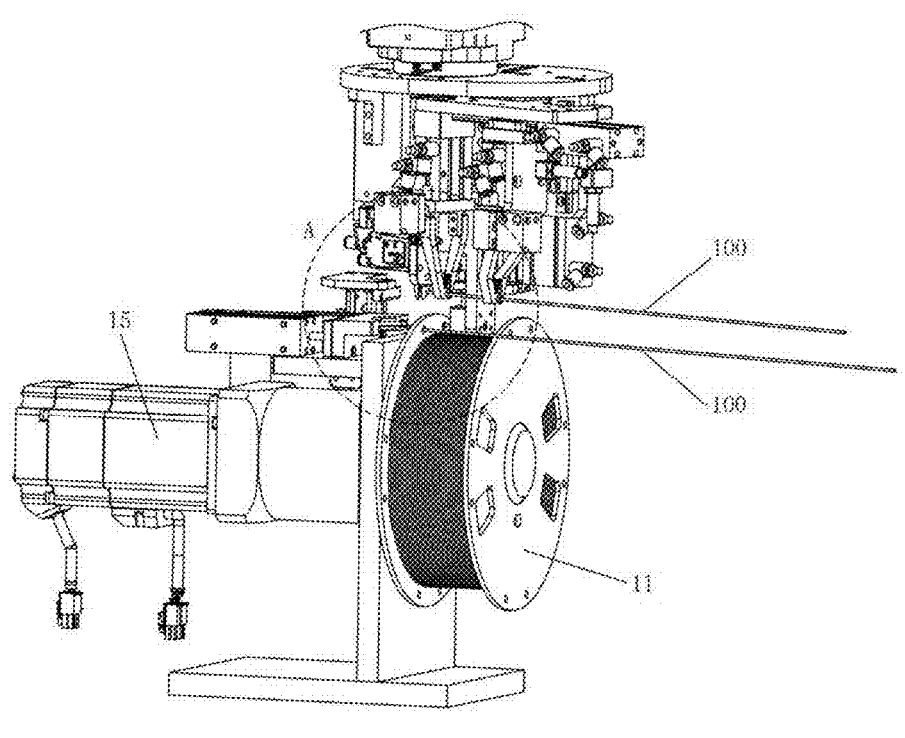
Figure 20:
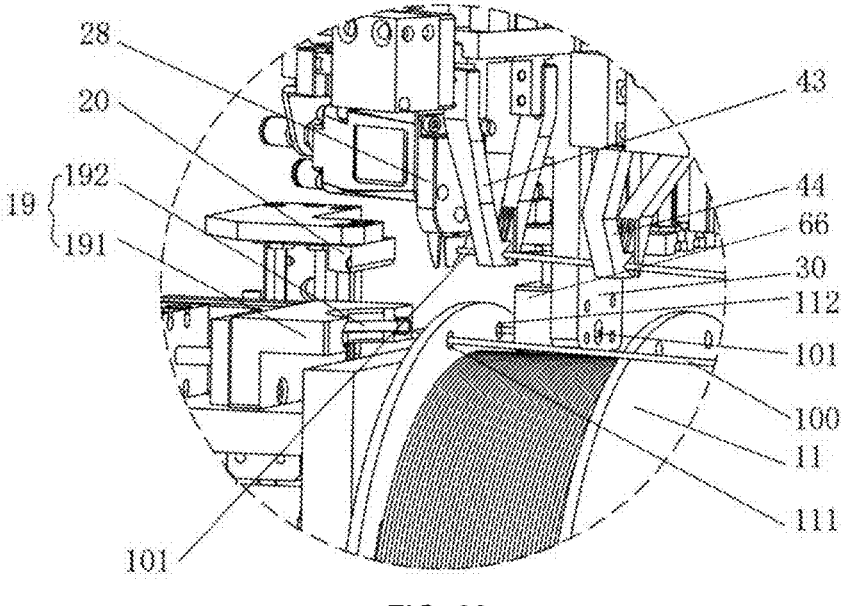
FIG. 20 is an enlarged diagram of portion A in FIG. 19.

To fix the tail end of the filament with the filament spool, a threading hole may be provided to the filament spool, and the tail end of the filament is passed through the threading hole and then tightened so as to fix the filament relative to the filament spool. As shown in FIGS. 19 and 20, two threading holes may be provided, i.e., a first threading hole 111 and a second threading hole 112. The tail end 101 of the filament 100 is passed through the first threading hole 111 and the second threading hole 112 sequentially, which secures the fixing of the filament 100 on the filament spool 11. The first threading hole 111 and the second threading hole 112 may be arranged on the same side of the filament spool 11. In this case, during the threading process, the tail end 101 of the filament 100 may be passed through the first threading hole 111 first, and then the tail end 101 of the filament is moved reversely to pass through the second threading hole 112, so as to complete the fixing of the filament 100 to the filament spool 11.

The device provided in some exemplary embodiments of the present disclosure can automatically pass the tail end 101 of the filament through the first threading hole 111 and the second threading hole 112, so that the filament 100 is fixed with the filament spool 11. The specific process is as follows.

The device provided in some exemplary embodiments of the present disclosure includes a filament threading module. The filament threading module includes a filament feeding module 29 and a filament guide mechanism 14. The filament feeding module 29 may automatically thread the tail end 101 of the filament into the first threading hole 111 of the filament spool. The filament guide mechanism 14 is configured to guide the tail end 101 to pass through the second threading hole 112 after the tail end 101 passes through the first threading hole 111.

The automatic filament ending line device of the present disclosure is provided with the filament guide mechanism 14. The filament guide mechanism 14 may guide the tail end 101 to pass through the second threading hole 112 after the tail end 101 passes through the first threading hole 111. Therefore, during the threading process, the filament feeding module 29 only needs to continuously feed the filament into the first threading hole 111. After the filament 100 enters the first threading hole 111, the direction reversal thereof can be finished by the filament guide mechanism 14, and then pass through the second threading hole 112 as driving by the continuous feeding by the filament feeding module 29. Therefore, the fixing of the filament 100 with the filament spool 11 can be completed without a complicated threading action of the filament feeding module 29, which is more convenient to implement.

Figure 3:
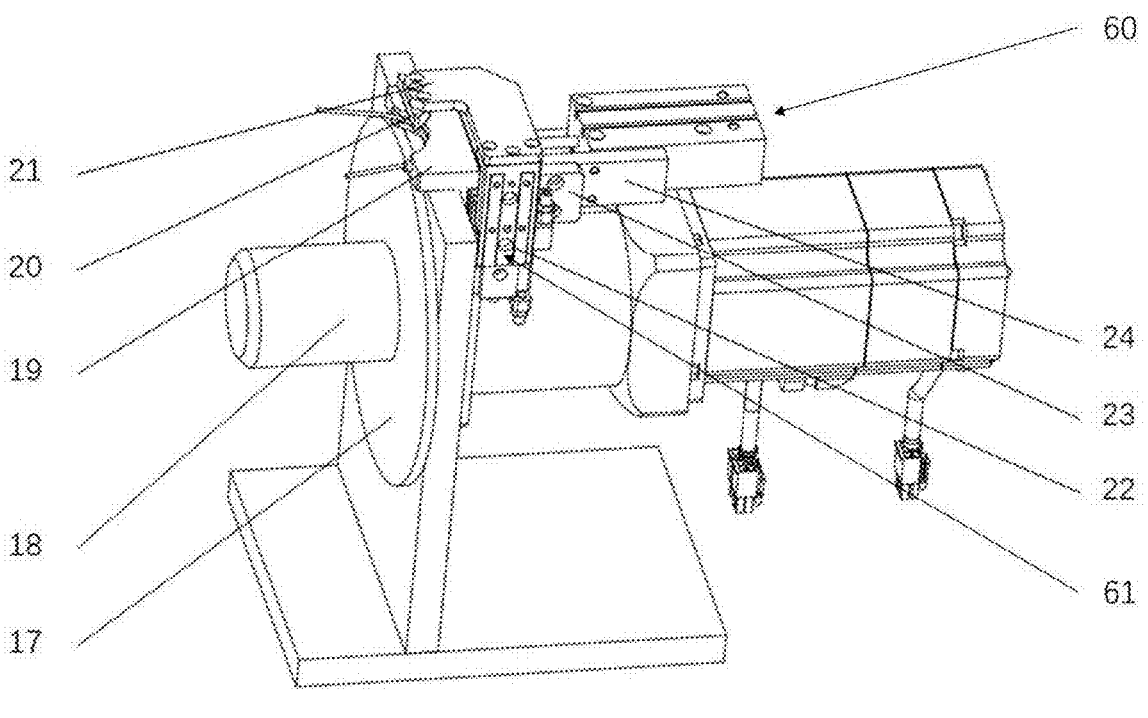
FIG. 3 is a schematic diagram of the structure of a filament winding module (without filament spool) according to some exemplary embodiments of the present disclosure.

As shown in FIG. 19 and FIG. 20, the filament guide mechanism 14 may include a filament guide assembly 19 and a filament guide driver 60 (shown in the FIG. 3). The filament guide assembly includes a base plate 191 and a filament guide 192 arranged on a first surface of the base plate 191. A first end of the filament guide 192 faces the first threading hole 111. A second end of the filament guide 192 faces the second threading hole 112. Thus, after the tail end 101 of the filament passes through the first threading hole 111, it can enter the filament guide 192 from the first end of the filament guide 192; due to the flexibility and toughness of the filament, the filament can bend and turn under the guidance of the filament guide 192, then pass through the second end of the filament guide 192 and then pass through the second threading hole 112.

It should be noted that the first end of the filament guide 192 faces the first threading hole 111 may be achieved by making the first end of the filament guide 192 directly attached to and communicated with the first threading hole 111, or by making the first end of the filament guide 192 face the first threading hole 111 with a gap. Similarly, that the second end of the filament guide 192 faces the second threading hole 112 may be achieved by making the second end of the filament guide 192 directly attached to and communicated with the second threading hole 112, or by making the second end of the filament guide 192 face the second threading hole 112 with a gap.

The filament guide driver is used to drive the filament guide assembly to move towards or away from the filament spool 11. Thus, when it is necessary to carry out the filament ending process, the filament guide driver may drive the filament guide assembly 19 to move in a direction towards the filament spool 11, so that the two ends of the filament guide assembly 19 are respectively connected to the first threading hole 111 and the second threading hole 112. When the filament ending process is finished, the filament guide driver may drive the filament guide assembly 19 to move away from the filament spool 11, so that the filament guide assembly 19 is separated from the filament, thereby facilitating removing the finished filament spool 11.

In order to prevent the filament from coming out of the filament guide 192 when passing through the filament guide 192, as shown in FIGS. 19 and 20, the filament guide mechanism may further include a cover plate assembly 20. The cover plate assembly 20 can cover the first surface of the base plate 191, and is used to close the filament guide 192 at an opening of the first surface, thereby preventing the filament from coming out from the filament guide 192. The cover plate assembly 20 may move relative to the filament guide assembly 19, and is connected to a cover plate driver 61 (shown in the FIG. 3). The cover plate driver 61 may drive the cover plate assembly 20 to move toward or away from the base plate 191. When a filament ending process, the cover plate driver 61 may drive the cover plate assembly 20 to move in a direction towards the filament spool 11, so that the cover plate assembly 20 may cover the first surface of the base plate 191. After the filament ending process is finished, the cover plate driver 61 may drive the cover plate assembly 20 to move away from the base plate 191, so that the cover plate assembly 20 may be separated from the filament. Therefore, the finished filament spool 11 may be easily removed.

There are many options for the shape of the filament guide 192, such as a continuous curve or a continuous broken line. For example, the filament guide 192 may be configured as a V-shaped recess, a U-shaped recess, or the like. The filament guide 192 may also be designed as an arc-shaped recess. The central angle corresponding to the arc-shaped recess may be 120°, 130°, 140°, 150°, 160°, 170°, 180°, and the like. The arc-shaped recess may guide the filament more smoothly, which can prevent the filament from being stuck in the filament guide 192. It is also possible to use a curve filament guide 192 and a broken line filament guide 192 in combination. That is, one section of the filament guide 192 is a curved recess, and the other section thereof is a broken like recess.

As shown in FIGS. 19 and 20, the filament guide assembly 19 may be arranged horizontally with the filament spool 11. This makes the first surface of the base plate 191 face towards the side where the filament spool 11 is provided with a threading hole. In this arrangement, the filament guide driver may drive the filament guide assembly 19 to move towards or away from the filament spool 11 in the horizontal direction. The cover plate driver may be configured to drive the cover plate assembly 20 to move towards or away from the base plate 191 in a vertical direction.

It should be noted that the above-mentioned filament guide driver and cover plate driver may be any device that can realize linear driving. For example, the above-mentioned filament guide driver and cover plate driver may be implemented by using a cylinder, a linear motor, or a rotation motor in cooperation with a linear transmission mechanism. For example, the filament guide driver may include a filament guide displacement cylinder 24 as shown in FIG. 3; the cover plate driver may include a cover plate lifting cylinder as shown in FIG. 3. In addition, the filament guide assembly 19 may also be arranged with the filament spool 11 in other directions, such as in a vertical direction. Specifically, a selection may be made according to the requirements of the specific filament production line, which is not limited in the present disclosure.

The main function of the filament feeding module 29 is to clamp and feed the filament into the first threading hole 111. The filament feeding module 29 may include a filament clamping module and a filament clamping displacement module. The filament clamping module is used to clamp the part of the filament near the tail end 101. The filament clamping displacement module may drive the filament clamping module to move towards or away from the first threading hole 111, so as to pass the tail end 101 of the filament into the first threading hole 111 on the filament spool 11.

As shown in FIGS. 19 and 20, the filament clamping module may include a first filament clamping module 43 and a second filament clamping module 44. The first filament clamping module 43 may be used to clamp a first part of the filament; the second filament clamping module 44 may be used to clamp a second part of the filament; the first part is closer to the tail end 101 of the filament than the second part. The filament clamping displacement module may include a first filament clamping displacement device and a second filament clamping displacement device. The first filament clamping displacement device may drive the first filament clamping module 43 and the second filament clamping module 44 to move integrally, so as to pass the tail end 101 of the filament through the first threading hole 111. After the tail end 101 of the filament passes through the first threading hole 111, the first filament clamping displacement device stops moving, and the first filament clamping module 43 releases the filament. At this moment, the second filament clamping displacement device may drive the second filament clamping module 44 to move back and forth in directions towards and away from the first threading hole 111 (during this process, the second filament clamping module 44 releases the filament when it is closest to the first threading hole 111 and then clamps the filament again when it is farthest from the first threading hole 111, that is, it performs the threading process), so as to pass the tail end 101 of the filament out from the second threading hole 112 by the filament guide mechanism 14.

The filament feeding module 29 may further include a filament clamping module lifting device. The filament clamping module lifting device is used to drive the first filament clamping module 43 and the second filament clamping module 44 to lift. Therefore, when it is necessary to carry out the filament ending process, it may drive the filament clamping module to move to a suitable position so as to clamp the filament. The filament clamping module lifting device may be a cylinder, a linear motor, or a rotation motor with a linear transmission mechanism. For example, the filament clamping module lifting device may include a filament clamping lifting cylinder 41 as shown in FIG. 7.

Figure 9:
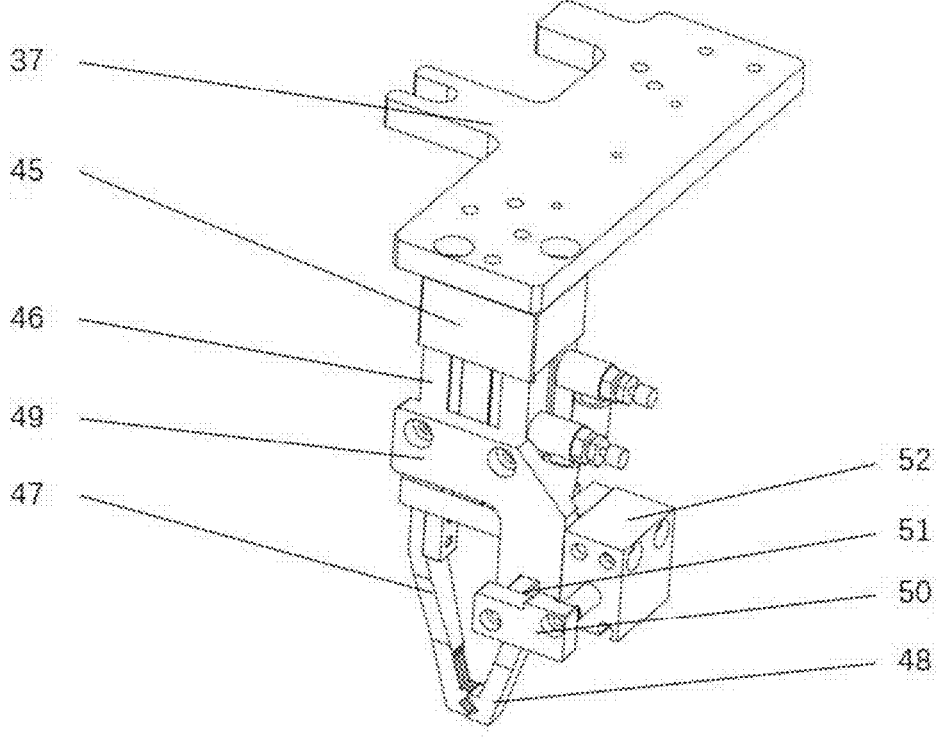
FIG. 9 is a schematic diagram of the structure of a first filament clamping module according to some exemplary embodiments of the present disclosure.

As shown in FIG. 9, the first filament clamping module 43 may include a first gripper primary jaw 47, a first gripper secondary jaw 48, and a first gripper driver (not shown in the figures). The first gripper driver may drive the first gripper primary jaw 47 and the first gripper secondary jaw 48 to move relative to each other so as to clamp the filament. For example, when clamping the filament, the first gripper primary jaw 47 does not move, the first gripper driver drives the first gripper secondary jaw 48 to move in a direction towards the first gripper primary jaw 47 so as to clamp the filament. It is also possible to keep the first gripper secondary jaw 48 still, and the first gripper driver drives the first gripper primary jaw 47 to move towards in a direction towards the first gripper secondary jaw 48 so as to clamp the filament. It is also possible that the first gripper driver simultaneously drives the first gripper primary jaw 47 and the first gripper secondary jaw 48 to move towards each other so as to clamp the filament.

Similarly, the second filament clamping module may include a second gripper primary jaw, a second gripper secondary jaw, and a second gripper driver (not shown in the figures). The second gripper driver may drive the second gripper primary jaw and the second gripper secondary jaw to move relative to each other so as to clamp the filament. For example, when clamping the filament, the second gripper primary jaw does not move, the second gripper driver drives the second gripper secondary jaw to move in a direction towards the second gripper primary jaw so as to clamp the filament. It is also possible to keep the second gripper secondary jaw still, and the second gripper driver drives the second gripper primary jaw to move towards in a direction towards the second gripper secondary jaw so as to clamp the filament. It is also possible that the second gripper driver simultaneously drives the second gripper primary jaw and the second gripper secondary jaw to move towards each other so as to clamp the filament.

Figure 10:
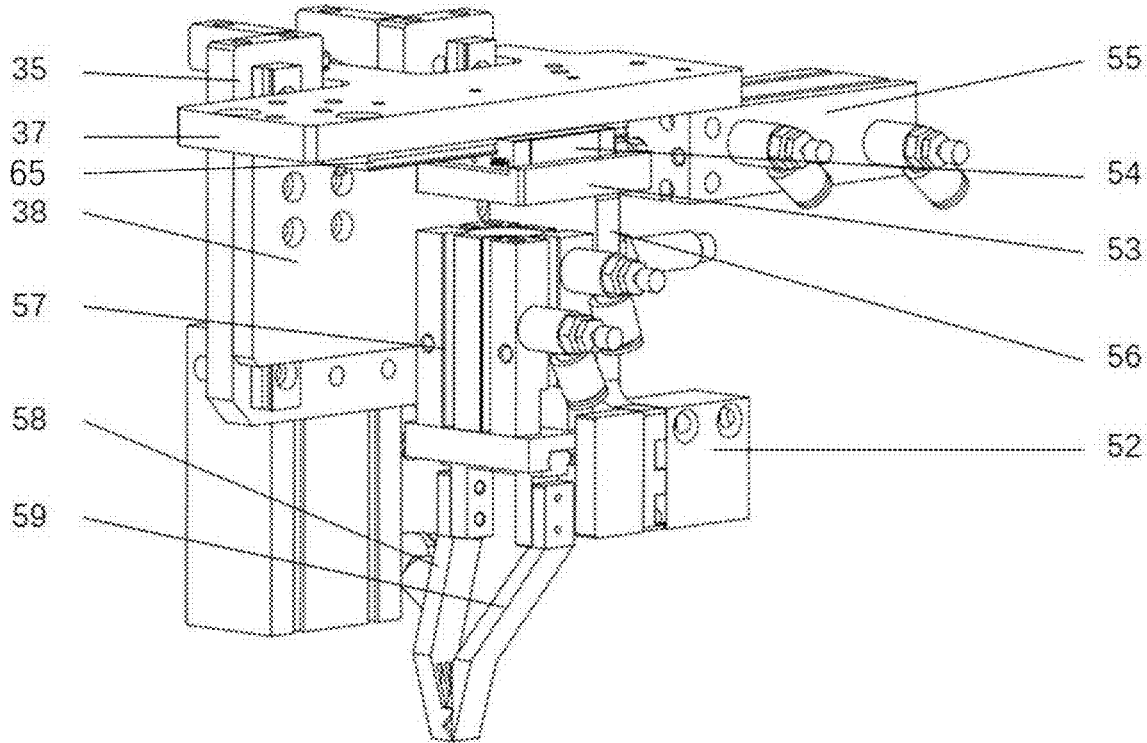
FIG. 10 is a schematic diagram of the structure of a second filament clamping module according to some exemplary embodiments of the present disclosure.
Figure 11:
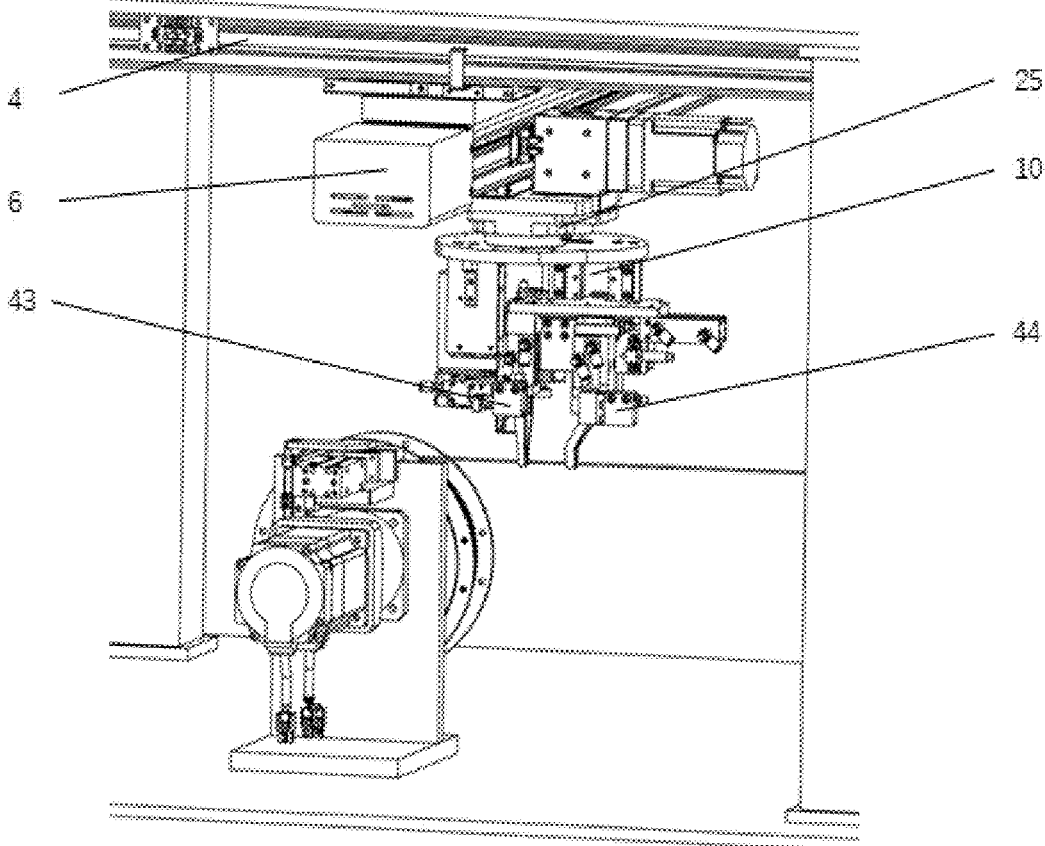
FIG. 11 to FIG. 19 are schematic diagrams of implementing an filament ending according to some exemplary embodiments of the present disclosure.
Figure 12:
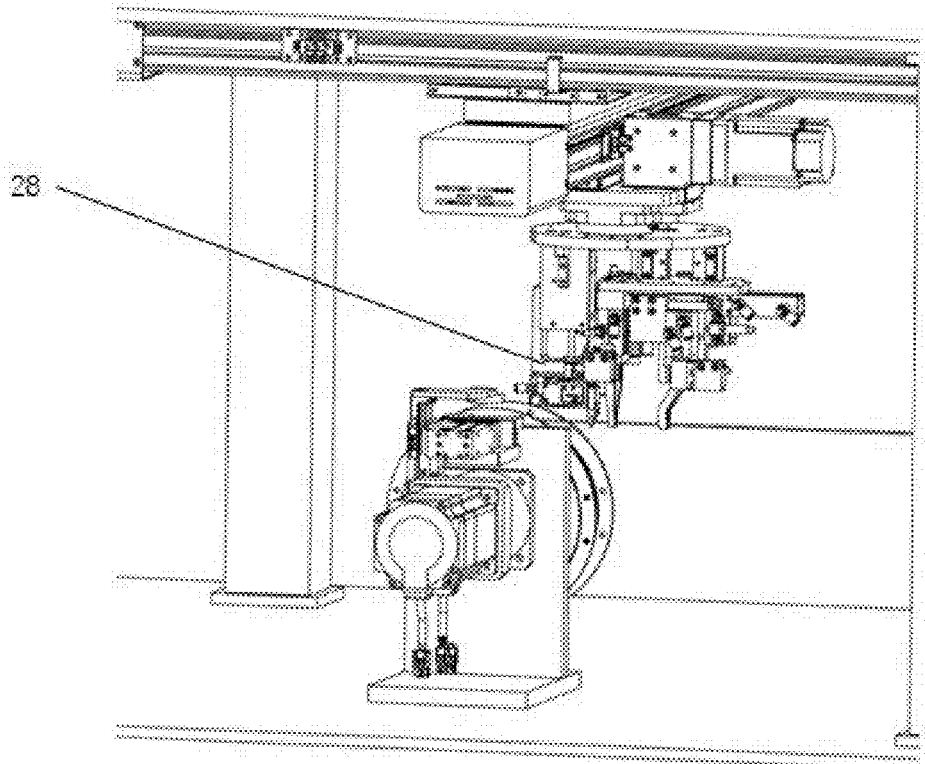
Figure 13:
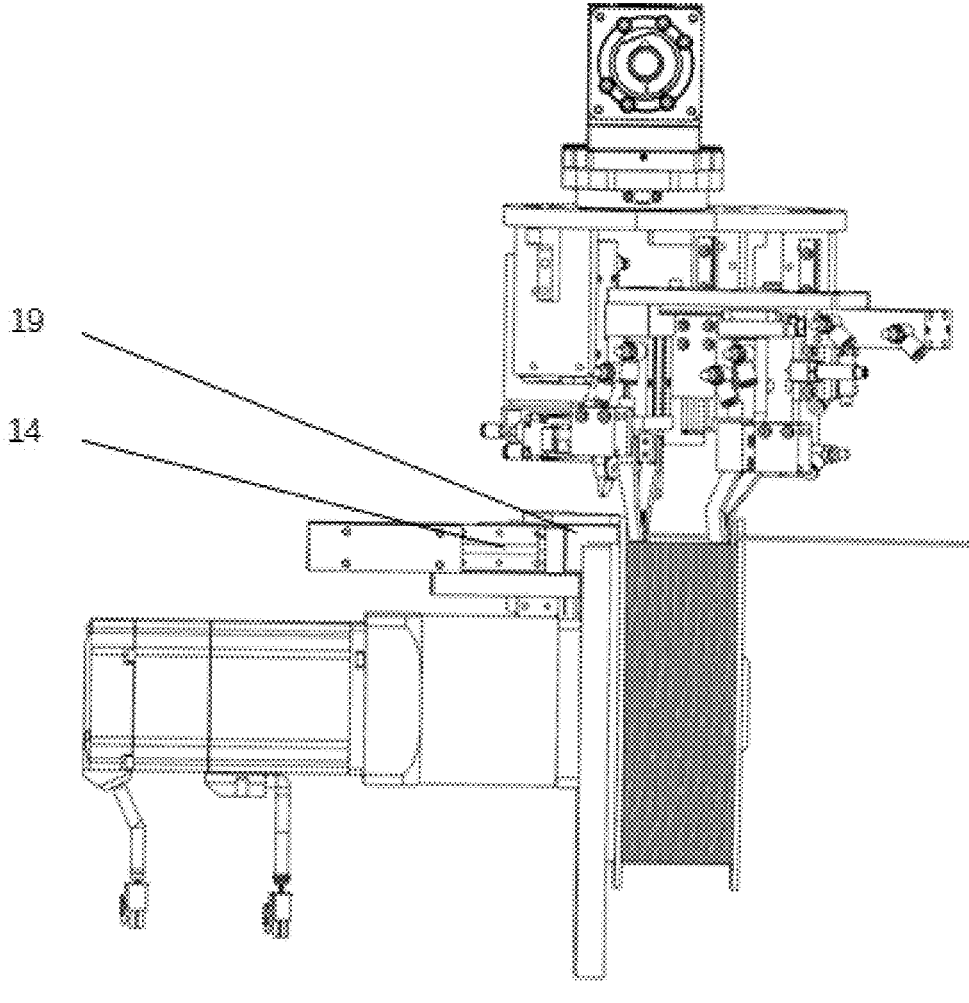
Figure 14:
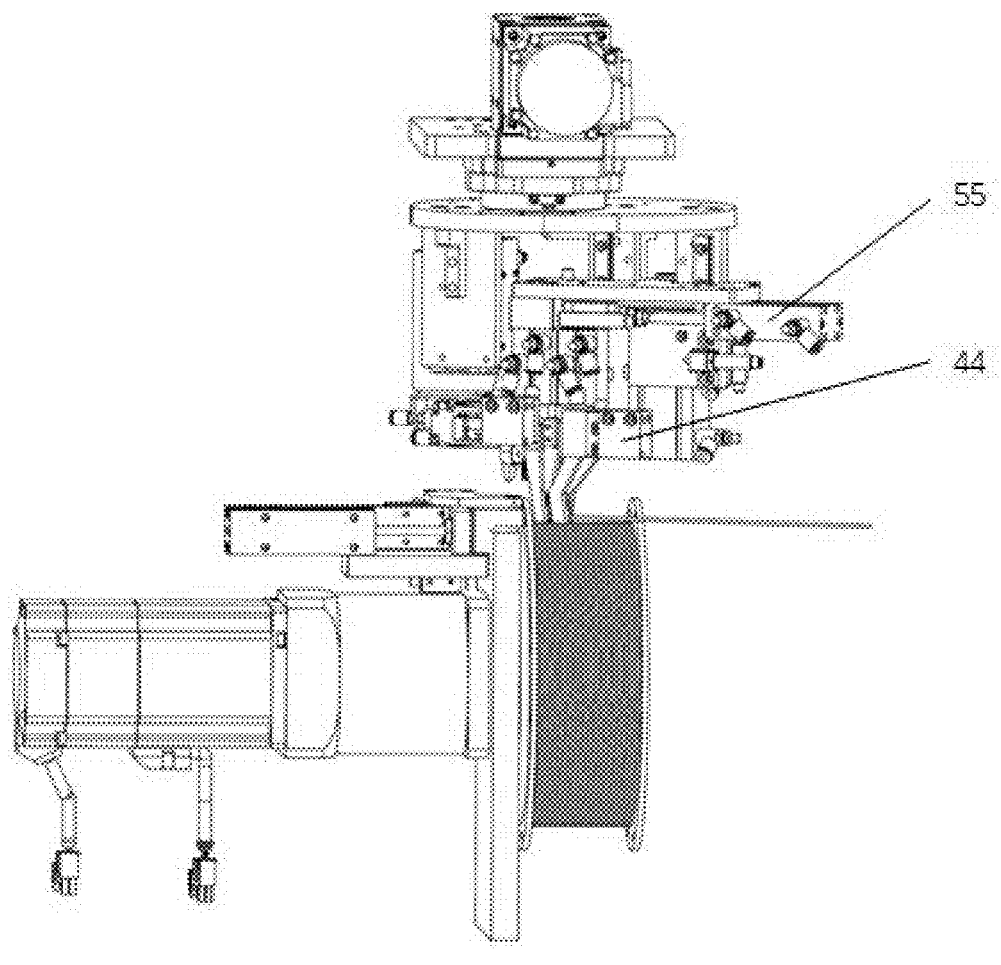
Figure 15:
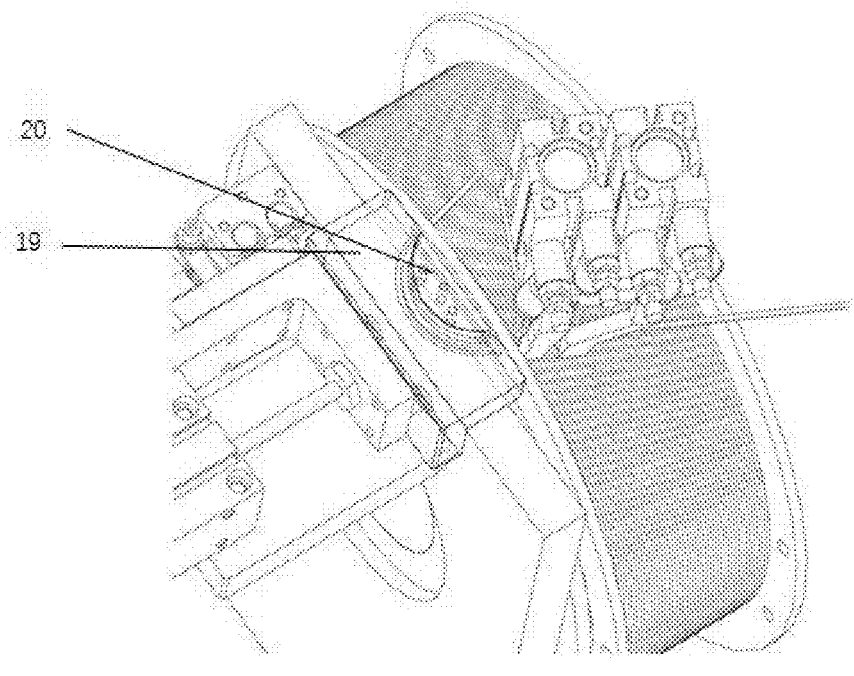
Figure 16:
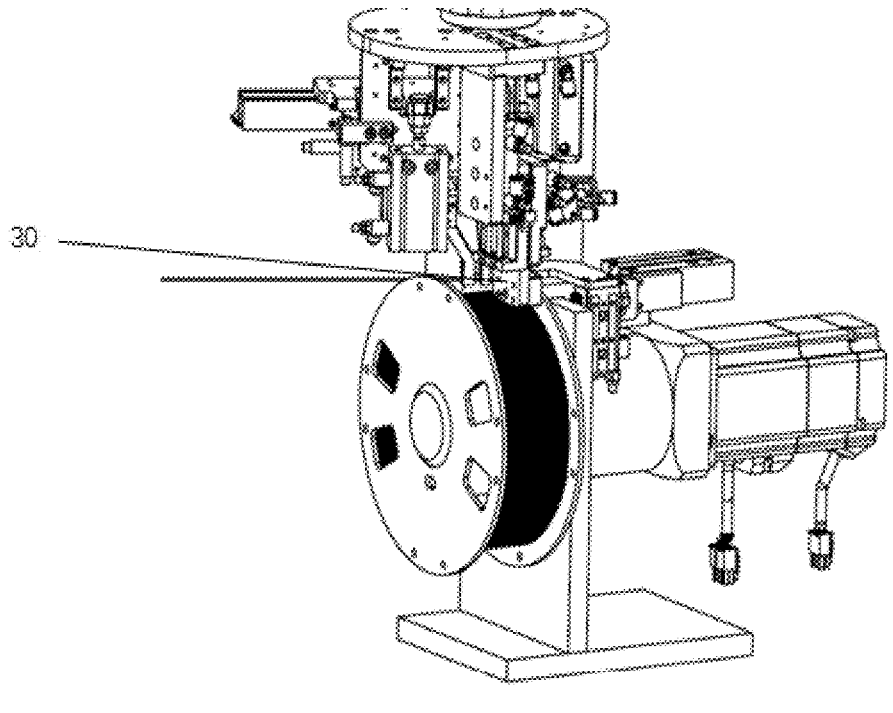
Figure 17:
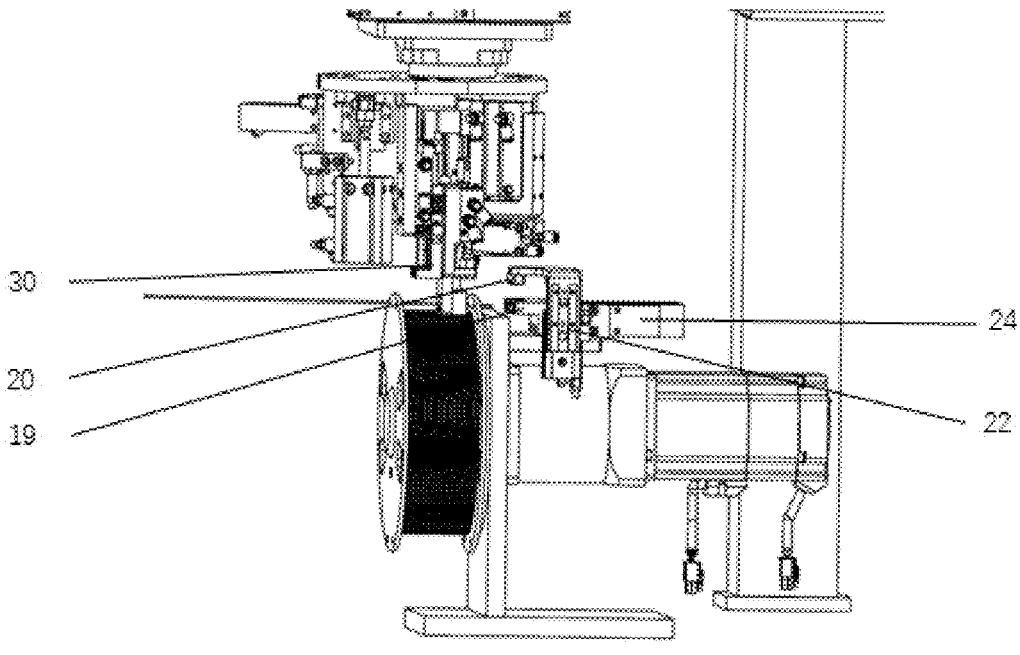
Figure 18:
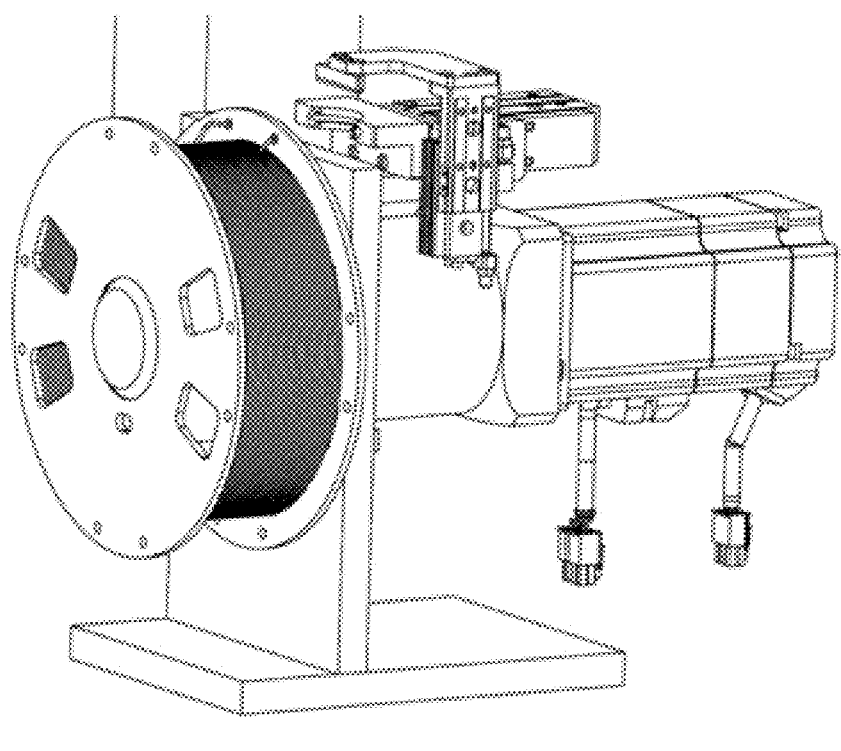

The above-mentioned first gripper driver and second gripper driver may share common driving parts such as cylinders and motors, which will not be repeated herein. For example, as shown in FIG. 9, the first gripper driver may include a first filament clamping cylinder 46; as shown in FIG. 10, the second gripper driver may include a second filament clamping cylinder 57.

After the tail end 101 of the filament passes through the first threading hole 111 and the second threading hole 112 sequentially, the tail end 101 of the filament can be tightened to prevent the filament from falling off from the first threading hole 111 and the second threading hole 112. In order to automatically carry out the tensioning process, as shown in FIG. 20, the filament threading module may further include a filament tensioning module 30. The filament tightening module 30 may automatically tighten the tail end 101 of the filament passed through the second threading hole 112.

The filament tensioning module 30 may include a tensioning gripper and a tensioning driver, where the tightening gripper is disposed on a filament exiting side of the second threading hole 112 to clamp the tail end 101 of the filament passed through the second threading hole 112. The tightening driver may drive the tightening gripper to move towards or away from the second threading hole 112 so as to automatically tighten the tail end 101 of the filament.

The above-mentioned tightening driver may adopt a common driving device, such as a cylinder, and a motor, etc., and details will not be repeated herein.

After the winding of the filament on a filament spool 11 is completed, the device provided by some exemplary embodiments of the present disclosure may perform the filament ending process to cut off an end of the filament not wound to the filament spool 11 and then knot and/or fix this end with the filament spool. In order to realize the function of automatically cutting the filament, as shown in FIG. 20, the device provided by some exemplary embodiments of the present disclosure may further include a filament cutting module 28. The filament cutting module 28 may automatically cut off the end of the filament that is not wound onto the filament spool 11 after the winding of the filament is completed, so as to form the tail end 101 of the filament.

The filament cutting module 28 may include an automatic cutter and a cutter driver. The automatic cutter may be opened and closed automatically to cut the filament. The cutter driver may drive the automatic cutter to move. The cutter driver may be used to drive the automatic cutter to move to a filament cutting position.

As shown in FIG. 6, the above-mentioned automatic cutter may be a pneumatic cutter 34, and the cutter lifting device may include a pneumatic cutter lifting cylinder 33. The pneumatic cutter lifting cylinder 33 may drive to pneumatic cutter 34 to move up and down.

In order to realize the overall movement of the filament threading module, the device provided in some exemplary embodiments of the present disclosure may further include a composite motion module. The composite motion module may drive the filament threading module to move to a preset position. For example, when the filament needs to be cut, the composite motion module may drive the filament threading module to move to the filament cutting position. When the tail end 101 of the filament needs to be threaded into the filament spool 11, composite motion module may drive the filament threading module to move to the filament threading position.

Figure 4:
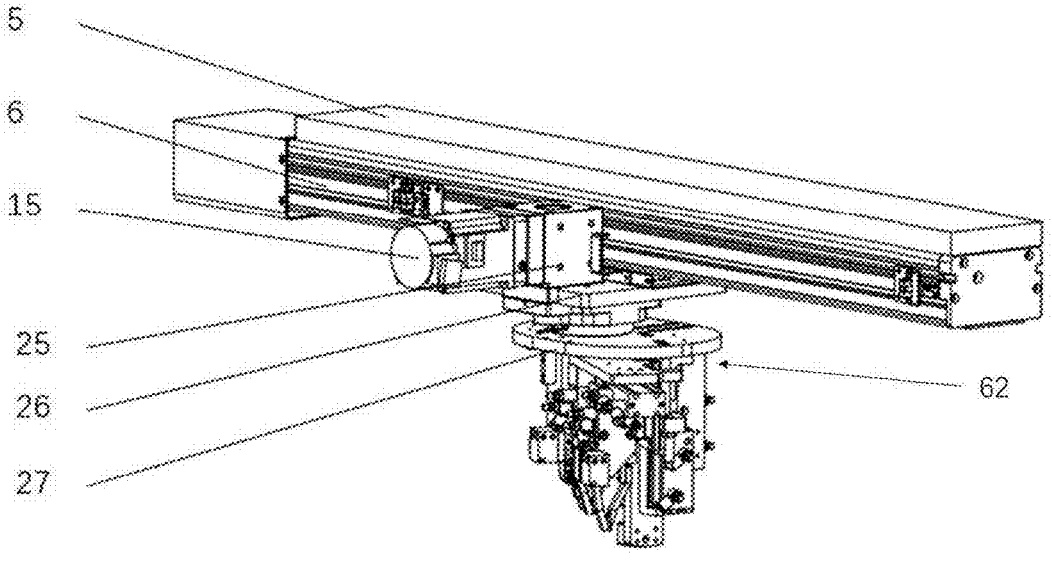
FIG. 4 is a schematic diagram of a connection structure of a filament threading module according to some exemplary embodiments of the present disclosure.

As shown in FIG. 1, the compound motion module may include a rotation motion module, an X-axis linear motion module 6, and a Y-axis linear motion module 4. The rotation motion module may drive the filament threading module to rotate, thereby adjusting the filament threading angle during a filament threading process. The X-axis linear motion module 6 may drive the rotation motion module and the filament threading module to move linearly along the X-axis. The Y-axis linear motion module 4 may drive the rotation motion module, the X-axis linear motion module 6 and the filament threading module 10 to move along the Y-axis. The rotation motion module may include a rotation platform 25 as shown in FIG. 4.

In order to automatically wind the filament onto the filament spool 11, the device provided in some exemplary embodiments of the present disclosure may further include a filament winding module. The filament winding module may wind the filament onto the filament spool 11. For example, the filament winding module may include a filament winding support, a transmission shaft, and a filament winding driver. The filament winding support may be used to provide support for the filament winding module. The transmission shaft may be arranged on the filament winding support and may rotate relative to the filament winding support. The filament winding driver may drive the transmission shaft to rotate, so that the filament spool 11 may rotate to take up the filament.

As shown in FIG. 2, the filament winding driver may be a servo motor 15. The filament winding support may include a filament winding bottom plate 12 and a filament spool mounting plate 13 arranged on the filament winding bottom plate 12. The transmission shaft may be arranged on the filament spool mounting plate 13.

In addition, the indicated orientations or positional relationships described in the present disclosure are all based on the orientations or positional relationships shown in the drawings. They are only for the convenience of describing the present disclosure and simplifying the description, rather than indicating or implying that the referred device or configuration must have those specific orientations or positional relationships, or operate in those configurations. Therefore, they should not be construed as limiting the present disclosure.

The above are only some exemplary embodiments of the present disclosure, and are not intended to limit the present disclosure. It should be pointed out that for a person of ordinary skill in the art, certain improvements and modifications may be made without departing from the technical principles of the present disclosure. These improvements and modifications should also be regarded as within the scope of protection scope of the present disclosure.

What is claimed is:

1. A device for fixing a tail end of a filament to a filament spool, comprising:
   a filament threading module, comprising:
      a filament feeding module comprising at least one gripper configured to clamp the filament by the at least one gripper and pass the tail end of the filament through a first threading hole on the filament spool, and
      a filament guide mechanism to guide the tail end to pass through a second threading hole on the filament spool after the tail end of the filament has passed through the first threading hole, wherein the filament guide mechanism comprising:
         a filament guide assembly comprising a filament guide, and
         a filament driver to move the filament guide assembly towards or away from the filament spool.

2. The device according to claim 1, wherein:
   the filament guide assembly further comprises a base plate; the filament guide is on a first surface of the base plate, having a first end facing the first threading hole and a second end facing the second threading hole; and the filament guide driver comprises a filament guide displacement cylinder to drive the filament guide assembly to move towards or away from the filament spool.

3. The device according to claim 2, wherein
the filament guide mechanism further comprises:
   a cover plate assembly, covering the first surface of the base plate to prevent the filament from coming out of the filament guide, and
   a cover plate driver comprising a cover plate lifting cylinder configured to drive the cover plate assembly, by the cover plate lifting cylinder to move towards or away from the base plate; and
the filament guide is at least one of a V-shaped recess, a U-shaped recess, or an arc-shaped recess.

4. The device according to claim 3, wherein
the filament guide assembly and the filament spool are arranged horizontally;
the first surface of the base plate faces the filament spool;
the filament guide driver is configured to drive the filament guide assembly, by the filament guide displacement cylinder to move towards or away from the filament spool in a horizontal direction; and
the cover plate driver is configured to drive the cover plate assembly, by the cover plate lifting cylinder to move towards or away from the base plate in a vertical direction.

5. The device according to claim 1, wherein the filament feeding module comprises:
   a filament clamping module, comprising jaws of the at least gripper to clamp a portion of the filament near the tail end; and
   a filament clamping displacement module comprising at least one filament clamping displacement cylinder to drive the filament clamping module to move towards or away from the first threading hole, so as to pass the tail end of the filament into the first threading hole.

6. The device according to claim 5, wherein
the filament clamping module comprises:
   a first filament clamping module comprising a first gripper primary jaw and a first gripper secondary jaw, configured to clamp a first part of the filament, wherein the first part is close to the tail end of the filament, and
   a second filament clamping module comprising a second gripper primary jaw and a second gripper secondary jaw, configured to clamp a second part of the filament, wherein the second part is on a side of the first part away from the tail end of the filament; and
the filament clamping displacement module comprises:
   a first filament clamping displacement device comprising a servo motor and a mounting plate to mount the first filament clamping module and the second filament clamping module, configured to drive the first filament clamping module and the second filament clamping module to move, so as to pass the tail end of the filament through the first threading hole, and
   a second filament clamping displacement device, comprising a second filament clamping displacement cylinder, configured to drive the second filament clamping module to reciprocate after the filament is released from the first filament clamping module, so as to pass the tail end of the filament through the second threading hole by the filament guide mechanism.

7. The device according to claim 6, wherein the filament feeding module further comprises:
   a filament clamping module lifting device comprising a filament clamping lifting cylinder configured to drive the first filament clamping module and the second filament clamping module, by the filament clamping lifting cylinder to move up and down;
   a main connection plate, connected to a main mounting plate, wherein the filament clamping module lifting device is arranged on a side of the main connection plate;
   a plurality of auxiliary reinforcement blocks arranged on the main connection plate;
   a cushion arranged on the main connecting plate; and
   a filament clamping mounting plate arranged on an upper end of the main connection plate, wherein the second filament clamping module is arranged on the filament clamping mounting plate.

8. The device according to claim 7, wherein the first filament clamping module comprises:
   a first gripper driver comprising a first filament clamping cylinder configured to drive at least one of the first gripper primary jaw or the first gripper secondary jaw, by the first filament clamping cylinder to move in order to clamp the filament.

9. The device according to claim 8, wherein the first filament clamping module further comprises:
   a first mounting block, connected to the filament clamping mounting plate, wherein the first gripper driver is arranged on the first mounting block;
   a first limit mounting block, arranged on the first filament clamping cylinder, wherein the first gripper primary jaw and the first gripper secondary jaw are arranged at a bottom of the first limit mounting block; and
   a first limit cylinder, arranged on the first limit mounting block, wherein a limit rod of the first limit cylinder passes through the first limit mounting block and then is provided with a limit connection block.

10. The device according to claim 9, wherein the second filament clamping module comprises:
   a second gripper driver comprising a second filament clamping cylinder configured to drive at least one of the second gripper primary jaw or the second gripper secondary jaw, by the second filament clamping cylinder, to move in order to clamp the filament.

11. The device according to claim 10, wherein the second filament clamping module further comprises:
   a slide rail, connected to the filament clamping mounting plate;
   a slider, slidably matched with the slide rail;
   a second filament clamping mounting block, arranged on the slider; and
   a second filament clamping mounting plate, arranged below the second filament clamping mounting block, wherein the second filament clamping cylinder is arranged on the second filament clamping mounting plate.

12. The device according to claim 11, wherein the filament threading module further comprises:
   a filament tightening module, configured to tighten the tail end of the filament passing through the second threading hole.

13. The device according to claim 12, wherein the filament tightening module comprises:

a tensioning gripper, arranged on a filament exiting side of the second threading hole to clamp the tail end of the filament passing through the second threading hole; and a tensioning driver, configured to drive the tensioning gripper to move towards or away from the second threading hole.

14. The device according to claim 1, further comprising:

a filament cutting module comprising a cutter, configured to cut off an end of the filament that is not wound onto the filament spool after the filament is wound on the filament spool, so as to form the tail end of the filament.

15. The device according to claim 14, wherein the cutter comprises a pneumatic cutter configured to automatically open and close to cut the filament; and the filament cutting module further comprises:

a cutter driver comprising a pneumatic cutter lifting cylinder configured to drive the automatic cutter to move to a filament cutting position, wherein the pneumatic cutter is arranged on the pneumatic cutter lifting cylinder; and a filament cutting mounting plate, wherein the pneumatic cutter lifting cylinder is arranged on a side of the filament cutting mounting plate, and a main reinforcement block is arranged on another side of the filament cutting mounting plate.

16. The device according to claim 1, further comprising:

a composite motion module comprising an X-axis linear rail, a Y-axis linear rail and a rotation platform, configured to drive the filament threading module to move to a preset position.

17. The device according to claim 16, wherein the composite motion module comprises:

the rotation motion module comprising the rotation platform, a platform mounting plate and a main mounting plate, configured to drive the filament threading module to rotate;

the X-axis linear motion module comprising the X-axis linear rail, configured to drive the rotation motion module and the filament threading module to move linearly along an X-axis; and the Y-axis linear motion module comprising the Y-axis linear rail configured to drive the rotation motion module, the X-axis linear motion module and the filament threading module to move along a Y-axis.

18. The device according to claim 17, wherein the composite motion module further comprises:

a composite motion module pillar, a mounting top plate, arranged on a top of the composite motion module pillar, wherein the Y-axis linear motion module is arranged below the mounting top plate, a module mounting plate, arranged on the Y-axis linear motion module, wherein the X-axis linear motion module is arranged on the module mounting plate, and a rail slider mounting plate, connected to the X-axis linear motion module via a heavy-duty rail slider; and the rotation platform is arranged on the X-axis linear motion module, the platform mounting plate is arranged on the rotation platform, and the main mounting plate is arranged below the platform mounting plate, wherein the filament cutting module and the filament threading module are arranged below the main mounting plate.

19. The device according to claim 1, further comprising:

a filament winding module comprising a filament winding support, a transmission shaft, and a filament winding driver, configured to wind the filament onto the filament spool.

20. The device according to claim 19, wherein:

the transmission shaft is rotatably arranged on the filament winding support, wherein the filament spool is arranged on the transmission shaft; and the filament winding driver comprising a servo motor, is configured to drive the transmission shaft to rotate, so that the filament spool rotates to take up the filament.

\* \* \* \* \*